Figure 1:
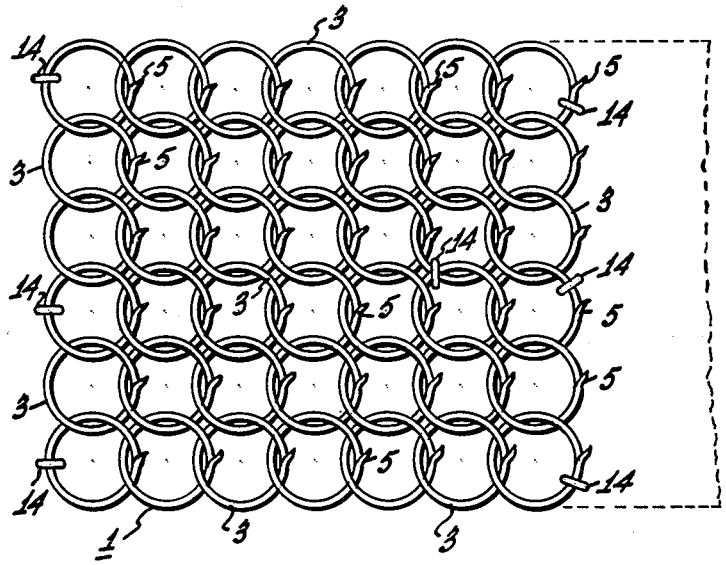

Sept. 25, 1962 H. H. ERICKSON 3,055,143
PROTECTIVE DEVICES FOR PLANT LIFE
Filed Aug. 17, 1959

INVENTOR.
HARRY H. ERICKSON
BY
ATTORNEY

United States Patent Office 3,055,143
Patented Sept. 25, 1962

3,055,143
PROTECTIVE DEVICES FOR PLANT LIFE
Harry H. Erickson, 2407 Whispering Pine Circle,
Albany, Ga.
Filed Aug. 17, 1959, Ser. No. 834,204
1 Claim. (Cl. 47—1)

This invention relates to protective devices for plant life, and more particularly to devices for protecting trees, shrubs, flowers, vegetables and other forms of plant life from attack by dogs and other animals.

It is well known that dogs, for example, make it a practice, when wandering about, to deposit urinary discharges against trees, shrubs, and the like. These discharges are not only harmful to plant life, but are also unsightly and frequently leave noxious odors. Dogs, cats and other animals are also known to sometimes dig into lawns, flower beds and the like with their claws and thus impair the appearance thereof.

The primary object of the present invention is to provide an improved protective device for all forms of plant life and surrounding areas which will protect such life and areas from attack by animals.

More particularly, it is an object of the present invention to provide an improved protective device for plant life which will effectively discourage animals from even approaching the plants, thus sparing them from use by animals for natural and other functions.

Another object of the present invention is to provide an improved protective device for plant life which can be placed readily along and around beds of trees, shrubs, and other plants to act as a barrier which animals approaching the beds must encounter prior to reaching the beds, and which will serve to dissuade animals from continuing in the direction of the plants when they attempt to approach the plants.

A further object of the present invention is to provide an improved protective device such as set forth above which can be readily hidden or camouflaged within a lawn so as to be practically invisible.

Still a further object of the present invention is to provide an improved protective device as above set forth which can be accommodated with facility to areas of irregular contour.

Another object of the present invention is to provide an improved protective device for plant life and the like as aforesaid which will not be harmful to animals subjected thereto.

It is also an object of the present invention to provide an improved protective device as set forth above which can be manufactured easily, which is economical in cost, and which is highly effective and efficient in use.

In accordance with one form of the present invention, there is provided a mat of loosely intertwined or interwoven links, preferably, but not necessarily, of bands of suitable metal, such as aluminum, each link having one or more upwardly extending barbs or sharp, upper edges thereon. Because the links are woven together loosely, the mats can be bent and contoured to fit areas of practically any shape. The links and barbs are so related that an animal, upon stepping on the mat, is bound to encounter one or more such barbs. The prick of these barbs will cause the animal to retreat hastily from the vicinity of the mat. Animals having experienced the unpleasantness of the barb pricks once or twice will thereafter invariably shy away from the vicinity of the mat. Thus, the plants about or along which such mats are disposed will be spared from encroachment by animals.

The novel features of the invention, both as to its organization and method of operation, as well as additional objects and advantages thereof, will be more readily understood from the following description thereof, when read in connection with the accompanying drawing, in which—

Figure 2:
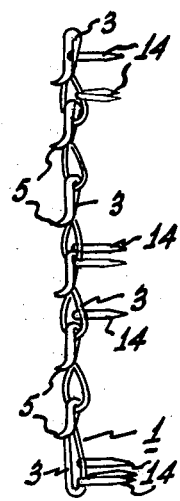
Figure 3:
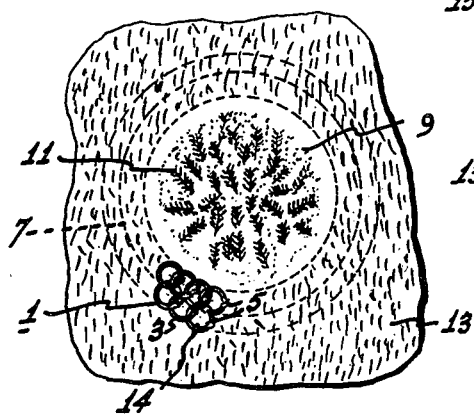
Figure 4:
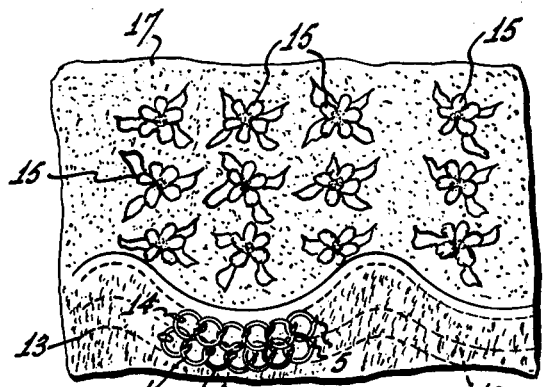

FIGURE 1 is a plan view of a portion of one form of protective mat according to the present invention, FIGURE 2 is an end view thereof, FIGURE 3 is a plan view showing a shrub with a fragmentary portion of a mat according to the present invention placed around the bed thereof, and FIGURE 4 is a similar view showing a flower bed having a somewhat scalloped or serpentine edge along which a mat according to the present invention is disposed.

Referring more particularly to the drawing, there is shown, in FIGURES 1 and 2, a multi-strand mat 1 made up of a plurality of loosely intertwined, individual links 3. These links 3 may be arranged in any desired numbers of strands of interconnected rows and columns, six horizontal rows and seven vertical columns being shown by way of example. In any event, the loose couplings between the individual links in the various strands permits the mat to be arranged either along a rectilinear path, as shown in FIGURE 1, or along curvilinear paths, as shown in FIGURES 3 and 4.

The individual links 3 are preferably formed as closed loops of any suitable shape. Merely by way of illustration, they are shown as substantially circular loops in plan (FIGURE 1), but they may have any other shape deemed desirable. Also, they may be made of any suitable material, such as metal, for example. In the case of metal, the links 3 may be made either of wire or of bands, each metal link 3 having at least one integrally formed, upstanding barb 5 thereon. Preferably, the links 3 are made of bands of aluminum of the order of ½ inch wide, and the barbs 5 extend upwardly therefrom approximately ¼ inch. The upper edges of the band links may also be made more or less sharp, if desired, to enhance the effectiveness of the mat. In any case, the links should be of such dimensions that the barbs thereon will be fairly close together so that there will be great likelihood that an animal, stepping upon the mat, will encounter one or more of the barbs with one paw or another.

A mat such as described above can be readily placed in a circular path 7 along the edge of a bed 9 of a shrub 11 which is to be protected against attack or trespass by animals. The mat 1 may rest on a grass lawn 13, for example, and may be anchored in place by means of one or more staples 14 driven into the ground at appropriately spaced points and embracing one or more of the links 3. In the case of flowers 15 and their bed 17 which are to be protected, the bed 17 having a somewhat scalloped or serpentine edge 19, as shown in FIGURE 4, the mat can be placed easily along such path. Both the circular and the serpentine arrangement can be accomplished without difficulty by reason of the loose connections of the various links 3 to each other. The loose arrangement of the links 3 also facilitates accommodation of the mat to the contour of the surface of the ground.

Since the links afford comparatively large, open areas in the mat, the grass in the lawn 13 can grow through and around the links substantially unhampered to a height appreciably greater than that of the mat. Moreover, since the links are quite shallow in height, they will not interfere with mowing or other customary treatment of a lawn on which the mat formed by the links is placed, since most lawns are mowed to a height two or three times the previously mentioned width of the band links, which is the thickness of the mat. Lawns are usually cut to a height of about 1 to 1½ inches. Hence, even when cut, the blades of grass in the lawn will substantially obscure the mat from view. This is even more effectively accomplished if the links 3 are colored substantially the same color as the grass. However, even though the mat is obscured from view, an animal treading thereon is bound to encounter at least some of the barbs and thus be driven away from the protected area.

Plant life and other objects around which or along which there has been placed a mat such as described above will be effectively protected against encroachment by animals such as dogs, cats, rabbits, and the like. When such animals attempt to step on the mat, the barbs 5 and/or the sharp, upper edges of the links 3, prick their paws and cause them to withdraw quickly from the protected areas. Merely one or two unpleasant experiences of this sort will suffice, in most cases, to cause the animals thereafter to shy away from such areas.

Although there has been described but one embodiment of the invention with several variations thereof, it will undoubtedly be apparent to those skilled in the art that many other variations and forms are possible within the spirit of the present invention. For example, where bands are employed as described above, the upper edges of the bands, instead of being made sharp, can be serrated to provide serrations which will dig into the paws of the animals and cause them discomfort.

It will also be apparent that mats according to the present invention may be employed as protective mats for purposes other than to protect plant life. For example, mats of this type with relatively heavier barbs can be placed around chicken coops to keep foxes from entering the coops and destroy chickens. Other uses and variations will, no doubt, also suggest themselves. Hence, it is desired that the foregoing shall be taken merely as illustrative, and not in a limiting sense.

I claim as my invention:

A mat adapted to be placed along an area to be protected from trespass by animals, said mat comprising a plurality of like, loosely interconnected, flat, completely arcuate, closed links each having at least one integral barb extending upwardly and outwardly from the top side thereof when the bottom side thereof is in contact with the ground, said links being of such size as to enable said mat to be accommodated along a curvilinear path.

References Cited in the file of this patent

UNITED STATES PATENTS

| | | |
|---|---|---|
| 389,593 | Parmiter | Sept. 18, 1888 |
| 1,146,891 | Maas | July 20, 1915 |
| 2,263,874 | Hilleman | Nov. 25, 1941 |
| 2,899,775 | Partin | Aug. 18, 1959 |

FOREIGN PATENTS

| | | |
|---|---|---|
| 7,547 | Australia | June 1, 1918 |